United States Patent [19]
Helbig, Sr.

[11] 3,728,682
[45] Apr. 17, 1973

[54] COMPUTER INPUT-OUTPUT CHAINING SYSTEM

[75] Inventor: Walter Allen Helbig, Sr., Medford Lakes, N.J.

[73] Assignee: RCA Corporation, New York, N.Y.

[22] Filed: Mar. 11, 1971

[21] Appl. No.: 123,281

[52] U.S. Cl. ....... 340/172.5
[51] Int. Cl. ....... G06f 3/00
[58] Field of Search ....... 340/172.5

[56] References Cited

UNITED STATES PATENTS

| | | | |
|---|---|---|---|
| 3,559,187 | 1/1971 | Figueroa | 340/172.5 |
| 3,588,831 | 6/1971 | Figueroa | 340/172.5 |
| 3,546,677 | 12/1970 | Barton | 340/172.5 |
| 3,488,633 | 1/1970 | King | 340/172.5 |
| 3,475,729 | 10/1969 | Porgelli | 340/172.5 |
| 3,411,143 | 11/1968 | Beavsoleil | 340/172.5 |
| 3,409,880 | 11/1968 | Galler | 340/172.5 |
| 3,406,380 | 10/1968 | Bradley | 340/172.5 |

*Primary Examiner*—Paul J. Henon
*Assistant Examiner*—Sydney R. Chirlin
*Attorney*—H. Christoffersen

[57] ABSTRACT

A computer input-output (I/O) system is disclosed which is particularly useful in the performance of text editing functions and the like, wherein it is desired to transfer scattered units or blocks of information in a particular desired order between a processor main memory and at least one I/O controller connected with an I/O device. A data word counter is provided in memory for the sequential addressing of the data words in each block of data. The addresses of the data word counters are stored in memory as a list of addresses in the order in which the blocks of data are to be transferred. A dedicated counter location is provided in memory for the sequential addressing of the list of addresses. The I/O controller is constructed to initially address the dedicated counter location in the memory and to cooperate with the processor in performing a sequence of steps which results in a transfer of all of the desired data in the desired sequence.

15 Claims, 6 Drawing Figures

INVENTOR.
Walter A. Helbig, Sr.
BY
Carl V. Olson
ATTORNEY

INVENTOR.
Walter A. Helbig, Sr.
BY Carl V. Olson
ATTORNEY

INVENTOR.
Walter A. Helbig, Sr.
BY
Carl V. Olson
ATTORNEY

INVENTOR.
Walter A. Helbig, Sr.
BY
Carl V. Olson
ATTORNEY

INVENTOR.
Walter A. Helbig, Sr.
BY
Carl V. Olson
ATTORNEY

INVENTOR.
Walter A. Helbig, Sr.
BY
Carl V. Olson
ATTORNEY

COMPUTER INPUT-OUTPUT CHAINING SYSTEM

The invention herein described was made in the course of, or under a contract or subcontract thereunder, with the Department of the Air Force.

BACKGROUND OF THE INVENTION

A computer system normally includes a central processor, a main memory and peripheral or input/output (I/O) devices such as magnetic tape stations, magnetic disc memory units, printers, card readers, display units, communications devices, etc. In addition, control units are included to facilitate the flow of information between the central processor and the peripheral devices. These control units receive I/O commands from the processor to establish conditions for the transfer of information between the main memory and a specified I/O device. Many housekeeping functions must be performed by the processor, under control of its program, such as determining the memory locations to be employed, etc. After all the conditions have been established for the information transfer, the particular I/O control unit can operate to control transfers of information words between the main memory and the particular I/O device without supervision by the processor. These transfers are accomplished using certain time-spaced ones of the periodic memory read-write cycles while the processor performs other tasks using the remaining ones of the read-write memory cycles.

Establishing the conditions for an information transfer between a particular memory location and a particular I/O device is a complicated and time-consuming overhead function performed by the processor. To reduce this processor overhead, it is known to employ a "chaining" instruction, and an I/O control unit which responds to a chaining command to transfer a second unit of information between a second I/O device and memory without the processor having to re-establish the transfer conditions for the transfer involving the second I/O device.

A computer system is often required to perform an editing function in which information must be rearranged. For example, the system may be required to assemble units of information located at various storage places and display them in a desired sequence on the screen of an I/O display device. This is accomplished by a computer program which first assembles and stores all the information in consecutive memory locations, with all information blocks appearing in the desired order. Then the processor establishes the conditions with a display device I/O control unit (controller) for the transfer of the contents of the consecutive memory locations to the particular display device.

The computer system may include an additional independent display device I/O controller for additional display devices. In this case, the processor assembles units of information into another set of consecutive memory locations for transfer through the second display I/O controller to one or more of its display devices. After the processor establishes conditions for memory transfers to the second controller, the processor and the two controllers operate independently in time sharing fashion in the use of memory read-write cycles.

The foregoing computer system, particularly when including two or more display I/O controllers, requires a large amount of main memory space because sequential locations must be provided for the rearranged information needed by the first I/O controller, and additional different sequential locations must be provided for the rearranged information needed by the second I/O controller.

Some prior art computer systems accomplish the described editing function in a different way, without first assembling the blocks of information in consecutive memory locations. The processor establishes the conditions for the transfer of the information in one block of sequential memory locations. After the transfer is finished, the processor again establishes the conditions for the transfer of the next desired information in another block of sequential memory locations. This procedure in which the overhead functions are performed for each block of sequential memory locations requires a large amount of processor time.

SUMMARY OF THE INVENTION

According to an example of the invention, memory space and/or processing overhead are conserved by a "memory chaining" arrangement wherein the address of the first data word of each block of information is stored in a respective data address counter location; a list of the addresses of the data address counter locations is stored in sequential memory locations; and the address of the first location of the list of addresses is stored in a dedicated counter location. The sequential accessing of the data words in each block is accomplished by the associated data address counter. The accessing of blocks in the desired sequence is accomplished by sequentially accessing the data address counters through the sequential list of their addresses by the dedicated counter. The entire transfer of data is accomplished with relatively little memory space, and with the performance of only one processor overhead procedure to establish the conditions for the entire transfer.

Figure 1A:
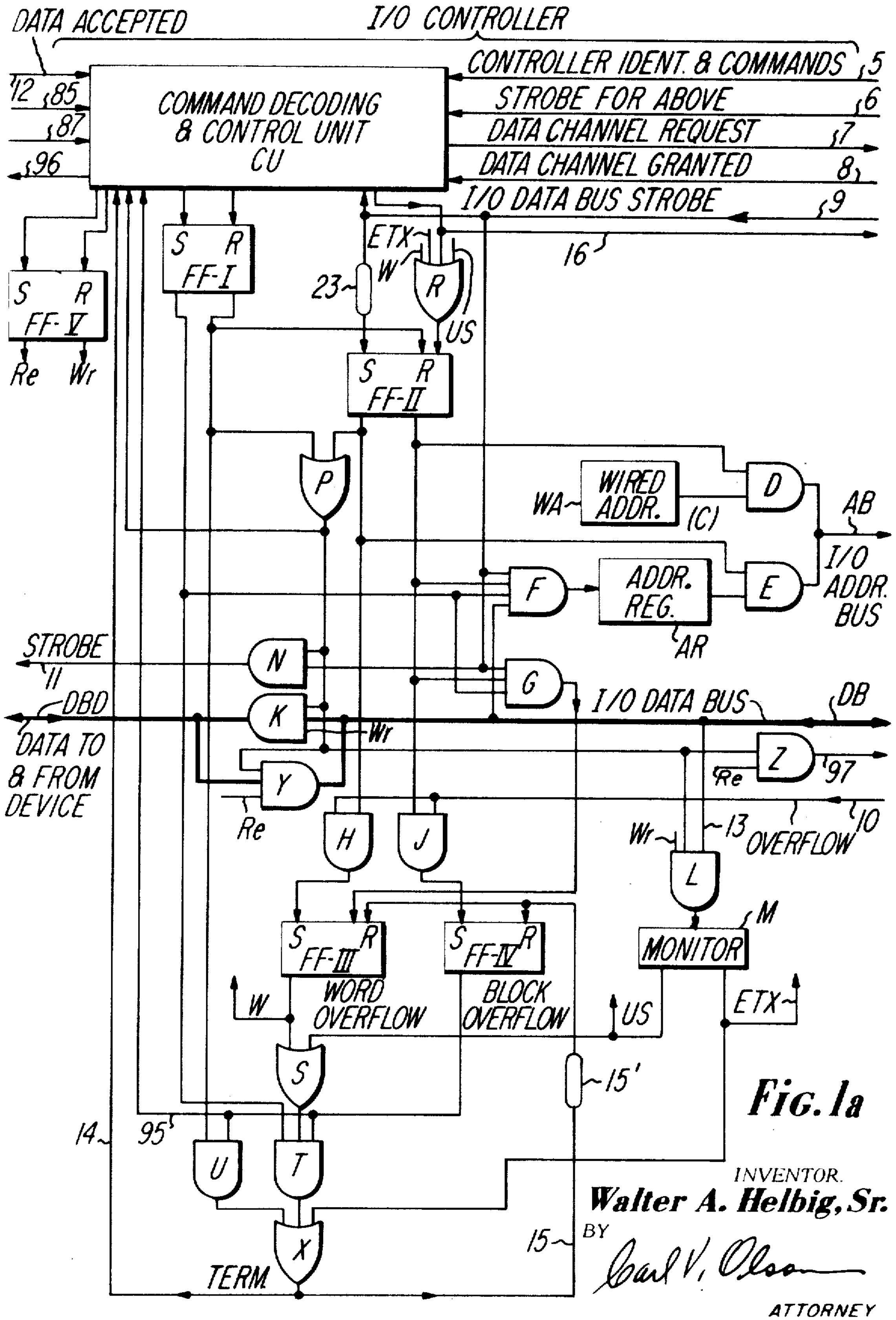
FIG. 1*a* is a diagram of an I/O controller constructed according to the teachings of the invention for use between an I/O device or devices and a computer.

DESCRIPTION OF FIG. 1*a*

Figure 1B:
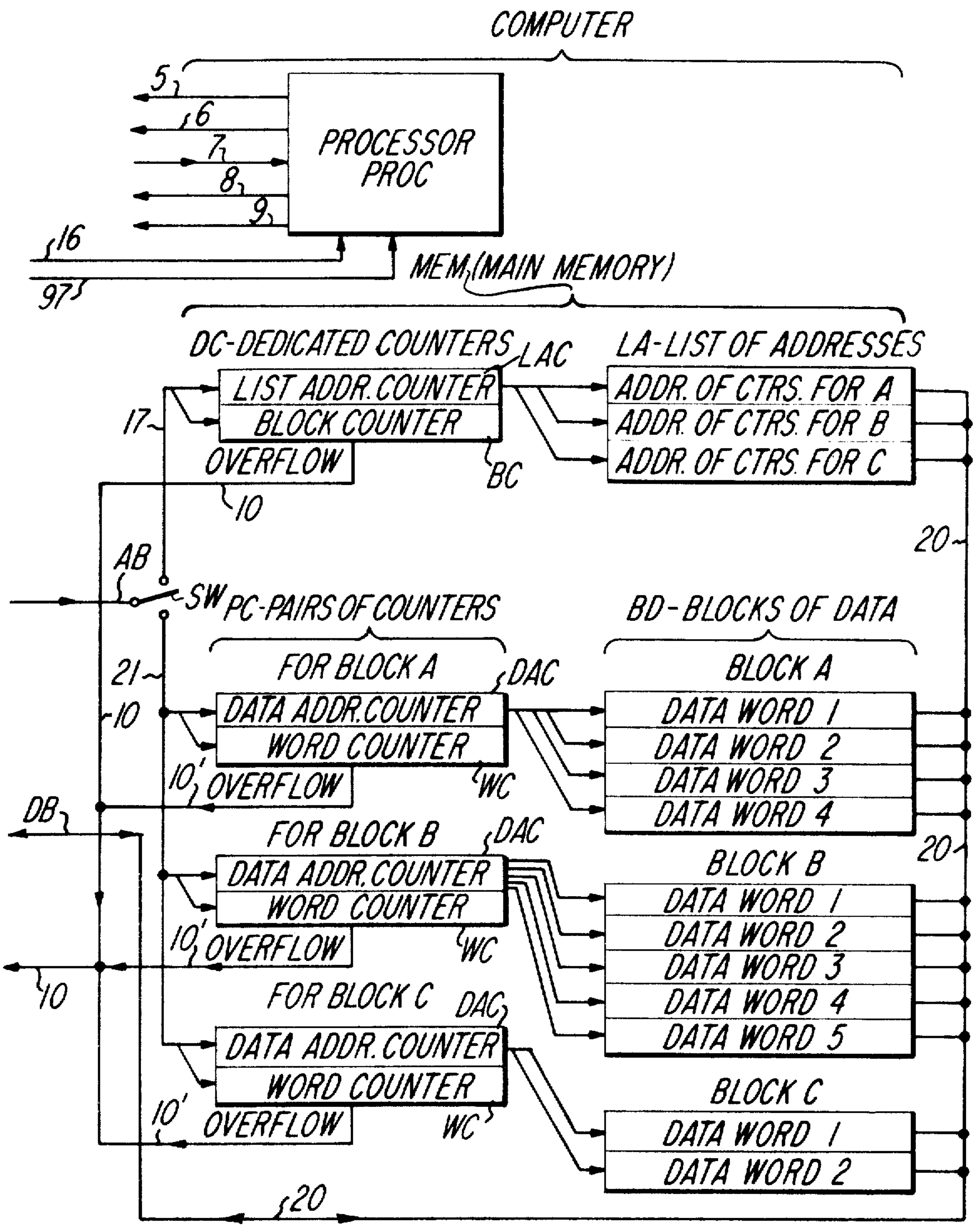
FIG. 1*b* is a hybrid diagram of a conventional, commercially-available computer including a processor and a main memory, the main memory being illustrated in terms of memory locations, and the utilization by the processor of the contents of the memory locations.

The I/O controller of FIG. 1*a* and the computer of FIG 1*b* are connected by a multi-conductor data bus DB over which data is transferred in both directions; a multi-conductor address bus AB over which memory addresses are transferred from the controller to the computer; and a plurality of control lines including a multi-conductor bus 5 for controller identification and commands going from the processor to the controller, a line 6 for a timing strobe to the controller, a data channel request line 7 to the processor, a channel granted line 8 to the controller, a data bus strobe line 9 to the controller, an overflow line 10 to the controller, and a terminate line TERM to the processor. The controller shown in FIG. 1A is connected with one or more I/O devices (not shown) by means of a multi-conductor device data bus DBD, a strobe line 11 for information on the bus DBD, and a data accepted line 12 for signalling the acceptance of data by the device.

The I/O controller of FIG. 1A includes a command decoding and control unit CU, and a flip-flop FF-1 which is set when a received command calls for a data transfer with memory chaining, and which is reset when a normal data transfer (without memory chaining) command is received. A flip-flop V is connected to be reset by the control unit CU when the command calls for a data transfer in the "write" direction. A flip-flop FF-II is provided to control transfers through gates D or E over address bus AB to the computer of either a fixed address from a wired, address register WA, or the contents of an address register AR. The address register AR is loaded with an address received from the computer over data bus DB and through gate F. At the same time that gate F is enabled for this purpose, gate G is enabled to reset a flip-flop FF-III.

Flip-flops FF-III and FF-IV are provided to be set through gates H and J by overflow signals received from the computer over line 10. Gates H and J are enabled by the set and reset outputs, respectively, of flip-flop FF-II in such a way that FF-III is set upon the receipt of an overflow signal originating in a word counter in FIG. 1*b*, and flip-flop FF-IV is set upon the receipt of an overflow signal originating in a block counter in FIG. 1*b*.

The data bus DB carries not only addresses from the computer which are destined for address register AR, but also carries data words transferred between the computer and the I/O device. The data path includes a gate K between the data bus DB and the device data bus DBD. Data on data bus DB is also supplied over line 13 and through gate L to a monitor M. The monitor M is constructed in a conventional manner to recognize control characters present in the data stream and to generate corresponding "Unit Separator," US, and "End of Text," ETX, output signals. A data bus strobe signal received on line 9 is passed through a gate N and over line 11 to the I/O device (not shown). All of gates K, L and N receive an enabling signal from an "or" gate P which passes a reset output from flip-flop FF-I, or a set output from flip-flop FF-II. Gates K and L receive an additional enabling signal from the reset or "write" output W*r* of flip-flop FF-V.

Flip-flop FF-II is reset through an "or" gate R whenever a US or an ETX signal is generated by monitor M, or whenever a set output W is provided by word overflow flip-flop FF-III. Gates S, T, U and X are provided and connected to produce a terminate signal TERM which is connected over line 14 to the control unit CU and therefrom over line 16 to the computer shown in FIG. 1*b*, and is connected over line 15 to reset flip-flops FF-III and FF-IV.

DESCRIPTION OF FIG 1*b*

Reference is now made to FIG. 1*b* for a description of the computer connected with the I/O controller of FIG. 1*a*. The computer may be a conventional, commercially-available computer such as the PDP-15 computer manufactured by Digital Equipment Corporation of Maynard, Mass. The computer includes a basic processor PROC and a main memory MEM. The memory MEM is illustrated by boxes representing memory word storage locations. The words in the boxes describe the contents of the storage locations, as established by the program in the computer for operation in conjunction with the I/O controller of FIG. 1*a*. The memory storage locations include locations DC for dedicated counters, locations LA for a list of addresses, locations PC for pairs of counters, and locations BD for blocks of data.

Figure 3:
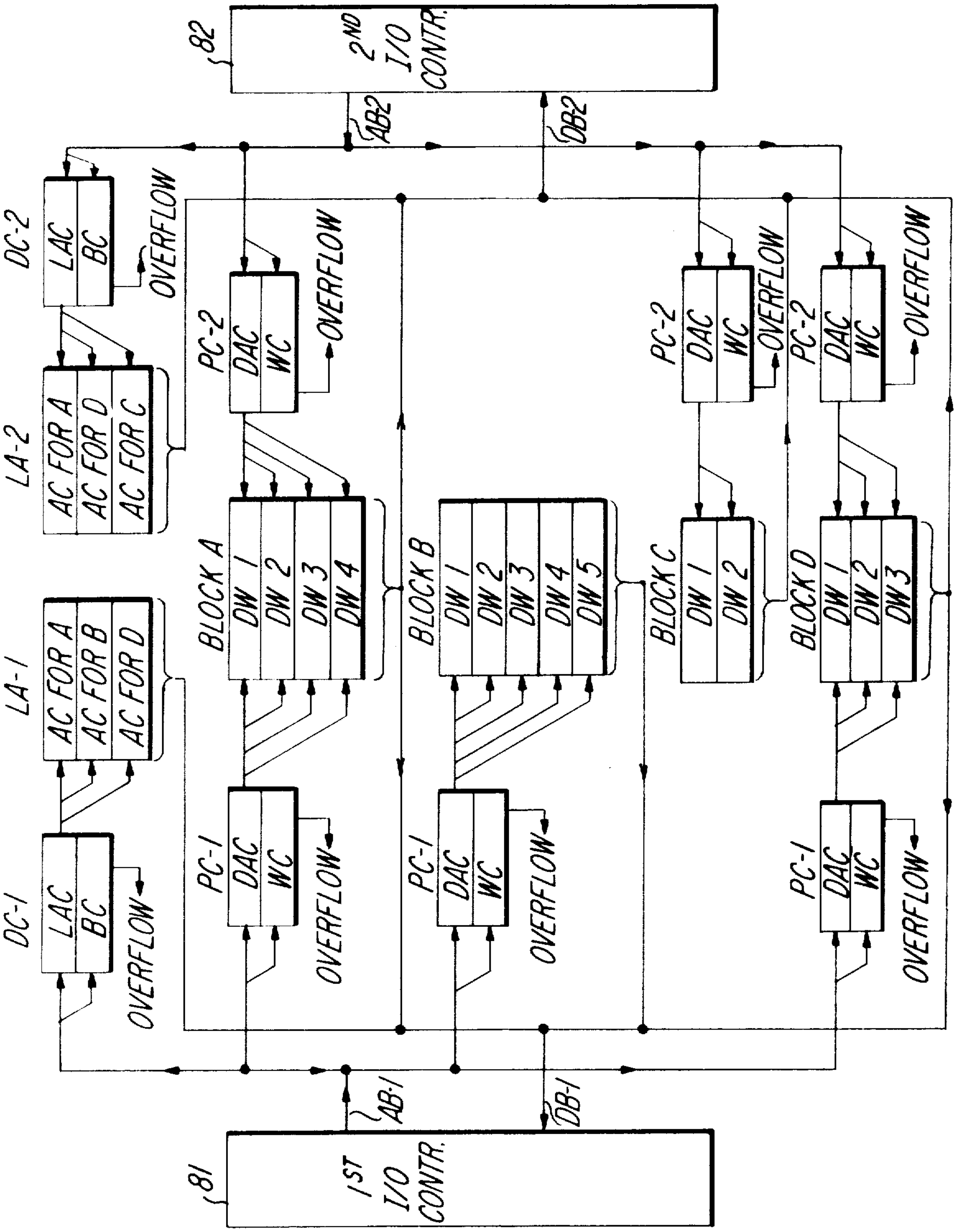
FIG. 3 is a diagram illustrating a system according to the invention which includes a plurality of I/O controllers connected with one computer.

The dedicated memory storage locations DC are used for a list address counter LAC and a block counter BC. The dedicated counters are dedicated to a particular I/O controller such as the one shown in FIG. 1*a*. If the overall system includes additional controllers, additional dedicated counter locations are provided in the memory for the respective additional controllers (as shown in FIG. 3). The memory space allocated for the dedicated counters may be a single memory word location, or may as shown, be two successive memory locations which can be automatically accessed in sequence. The dedicated counter locations have an address in memory which is fixed and is the same as the address available from the wired address unit WA in the controller of FIG. 1*a*.

The memory locations LA consist of sequential locations for a list of addresses, each location containing the address of a pair of counters for a particular block of data. In the example illustrated, there are three blocks A, B and C of data. The three lines extending from the list address counter LAC to the list of addresses LA represent the operation of the computer on three successive occasions in using the contents of the list address counter to fetch addresses from the list of addresses LA. Every time the contents of the list address counter LAC is thus employed, the contents of the block counter BC is decremented from an initial count of three. When the block counter BC is decremented to zero, an overflow signal is generated by the computer and sent over line 10 to the controller of FIG. 1A.

The memory locations PC consists of locations for a pair of counters for data block A, locations for a pair of counters for data block B and locations for a pair of counters for data block C. The pair of locations for data block A contain a data address counter DAC and a word counter WC. The four lines extending from the data address counter DAC represent the operation of the computer on four successive occasions using the contents of the data address counter DAC to fetch the four data words from the block A of data words. Every time the content of the data address counter DAC is thus employed, the content of the word counter WC is decremented from an initial count of four. When the word counter WC is decremented to zero, an overflow signal is generated by the computer and sent over line 10 to the controller of FIG. 1*a*. The pairs of counters for blocks B and C are employed in a corresponding fashion in relation to the blocks B and C of data words, respectively. The data words thus fetched are transmitted over bus 20 and data bus DB to the controller.

The memory locations BD for blocks of data consist of sequential data word locations for block A, sequential locations for block B and sequential locations for block C. The blocks A, B and C need not be in sequential locations, and may be located anywhere in the memory.

To summarize, the main memory MEM has storage locations for dedicated counters, a list of addresses, pairs of counters, and blocks of data. The dedicated counters have a fixed address which is wired into the I/O controller of FIG. 1*a*. The list of addresses, the pairs of counters, and the blocks of data are in memory storage locations determined by the computer program, and contain addresses and data also determined by the computer program. The rectangles in the computer memory in FIG. 1*b* represent memory word storage locations. The descriptions within the rectangles represent the nature of the information stored in the respective memory storage locations. The lines connected from and to the rectangles represent the way in which the processor utilizes the contents of memory storage locations to address other memory storage locations, and finally to transfer the contents of data word storage locations through the I/O controller to the I/O device. The flow of data words is described as going in a "write" direction from the computer to the I/O device. The flow of data words in the opposite or "read" direction from the I/O device to the computer will be described later, with references to the flow chart of FIG. 4.

OPERATION OF FIGS 1*a* AND 1*b*

The operation of the I/O controller of FIG. 1*a* and the computer of FIG. 1*b* in the performance of memory chaining of data blocks A, B and C, by way of example, will now be described for the "write" direction of data flow, with references also to the flow chart of FIG. 2*a*. The operation to be described may be outlined as follows:

1. Initiate memory chaining.
2. Establish data channel.
3. Transfer wired address over address bus to get address and transfer it over data bus to address register.
4. Transfer contents of address register over address bus to get data word and forward it to the I/O device, and then repeat 2 and 4 until all data words of block A are transferred.
5. Repeat 3 for data block B.
6. Repeat 4 for data block B.
7. Repeat 3 for data block C.
8. Repeat 4 for data block C.
9. Terminate.

1. Initiate Memory Chaining

The initiation procedures for memory chaining are illustrated in the flow chart of FIG. **2*a* by 30-Start, 31-Controller Identification and Command Received from Processor, 33-Decode Command, 34-Decide if Memory Chaining is called for, and 35**-Set Flip-flop FF–I to reach point $\epsilon$ in the flow chart. These initiation procedures in the equipment of FIGS. 1*a* and 1*b* involve a transfer over bus 5 of controller identification and command information from the computer to the control unit CU in the controller, a timing strobe applied over line 6, a decoding of the received command in control unit CU, a decision that memory chaining is required in the "write" mode, a setting of flip-flop FF–I, and a resetting of read-write flip-flop FF–V.

2. Establish Data Channel

The establishment of a data channel is illustrated in the flow chart between the points $\epsilon$ and $\alpha$ by 36-Send Data Channel Request to Processor, 37-Request Granted, and 38-Recognition that Flip-flop FF–II is Reset. These data channel procedures in the equipment involve a "Data Channel Request" signal sent over line 7 to the processor, a "Data Channel Granted" signal on line 8 to the control unit CU and a recognition by the controller of the fact that its flip-flop FF–II is in its reset state as the result of having been reset at the end of a previous operation.

3. Use of Wired Address

The transfer of the wired address WA to the processor, the obtaining of an address from the memory, and the transfer of the address to the address register AR, is illustrated in the flow chart by a "wired address" path from point $\alpha$ to point $\beta$, which includes, 39-Gate Wired Address to Address Bus, 40-I/O Data Bus Strobe, 41-Gate Data Received on I/O Data Bus to Address Register, 42-Reset Flip-flop FF–III, 43-Detect Overflow Signal, and 45-Set Flip-flop FF–II. These steps are accomplished in the equipment as follows:

Gate D is enabled by the reset output of flip-flop FF–II to pass the fixed address from wired address unit WA through the address bus AB to the computer, where it is passed through switch SW and bus 17 to accomplish the addressing of the dedicated counters DC. The computer then uses the content of the list address counter LAC to access the content of the first storage location in the list of addresses LA. The computer then increments the list address counter LAC and decrements the content of the block counter BC, which was initially loaded by the program with the number three corresponding with the number of blocks of data to be transferred.

The computer then transfers the "address of the counters for data block A" from the list of addresses LA over bus 20 and through I/O data bus DB to the I/O controller where it is passed through gate F to the address register AR. Gate F is enabled by an I/O data bus strobe received from the processor on line 9, by the reset state of flip-flop FF–II, and by the set state of flip-flop FF–I. Gate G is enabled by the same signals which enable gate F, and the output of gate G causes the resetting of flip-flop FF–III. Flip-flop FF–III remains reset because no overflow signal is received on line 10. After a delay introduced by the delay device 23, the I/O data bus strobe sets flip-flop FF–II. This completes the flow chart loop from point $\alpha$ to point $\beta$, and a return over path 50 to the point $\epsilon$.

4. Transfer Data Block A

The steps now followed for the purpose of transferring the data word 1 of data block A from the memory MEM through the controller to the I/O device are illustrated in the flow chart by the path from point $\epsilon$ through $\theta$ and $\phi$ and back over paths 63 and 50 to the point $\epsilon$. The flow chart path from point $\epsilon$ to point $\theta$ is the data channel establishment procedure which has already been described, but with the difference that point $\theta$ (instead of $\alpha$) is reached because flip-flop FF–II was set at the end of the preceding flow chart "wired address" loop. The flow chart path from $\theta$ to $\phi$ may be called an "address register" loop, because the address register AR is employed in place of the wired address WA.

The flow chart path from point $\theta$ to point $\phi$ includes the steps of 52-Gate Contents of Address Register to Address Bus, 53-Send Data Received on I/O Data Bus to I/O Device and to Monitor M, 54-Recognize I/O Data Bus Strobe, 55-Send I/O Bus Strobe to I/O Device, 56-Recognize ETX signal, 57-Recognize US signal, 58-Recognize Overflow signal, and 62-Recognize Data Accepted signal. These flow chart steps between points $\theta$ and $\phi$ are accomplished in the equipment as follows:

Gate E is enabled by the set state of flip-flop FF–II to pass the content of address register AR through address bus AB to the computer where the computer directs the address through switch SW and bus 21 to address the memory locations containing a pair of counters for data block A. The computer then uses the address in the data address counter location DAC to address the first data word location in data block A. The computer then increments the data address counter DAC, and decrements the word counter WC, which was initially loaded by the computer program with the number (four) of data words in the data block A. The data word 1 is then transferred over bus 20 and data bus DB to the controller. The data word 1 is passed by gate K over data bus DBD to the I/O device (not shown) because gate K is enabled through "or" gate P by the set state of flip-flop FF–II and by the reset state of flip-flop FF–V. The I/O device then sends a "Data Accepted" signal over line 12 to the control unit CU. This completes the flow chart "address register" loop from point $\theta$ through point $\phi$ and back over paths 63 and 50 to the point $\epsilon$.

The same path, $\epsilon$ through $\theta$ and $\phi$, and back to $\epsilon$, is followed to accomplish the transfer of data word 2 from the memory MEM to the I/O device. The same path is followed a third time to transfer data word 3, and is followed a fourth time to transfer data word 4. Each time a data word is transferred, the data address counter DAC is incremented, and the word counter WC is decremented.

4*a*. Word Overflow

When data word 4 has been transferred, the word counter WC has been decremented to zero, and the computer supplies an overflow signal over lines 10' and 10 to the controller. This action is illustrated in the flow chart of FIG. 2*a* by the decision box 58, which now has a "yes" output path that results in steps 59-Set Flip-flop FF–III, 60-Reset Flip-flop FF–II, 61-Determine that Flip-flop FF–IV is Not Set, and a path through decision box 62 back to point $\epsilon$ in the flow chart.

In the equipment, the overflow signal on line 10 enables gate H because flip-flop FF–II is still set. Gate H sets flip-flop FF–III which then has a set output signal W representing "word overflow" which passes through "or" gate R and resets flip-flop FF–II. After a "Data Accepted" signal is received by the control unit CU from the device over line 12, the equipment is ready to start the transferring of the first data word of data block B.

5. Use Wired Address for Data Block B

The transfer of the first word of data block B starts at point $\epsilon$ in the flow chart and follows the "wired address" path to point $\beta$. The steps include transferring the wired address WA for use by the computer in getting the content of the list address counter LAC and using it to address the second address in the list LA (which contains the address of the counters for data block B), and transferring this address over bus 20, data bus DB and gate F to the address register AR. The list address counter LAC is then incremented and the block counter BC is decremented.

6. Transfer Data Block B

The content of address register AR is then applied through gate E and over address bus AB to the computer which uses the address over bus 21 to address the pair of counters for data block B. The contents of the data address counter DAC is used to access the first data word in data block B and send it over bus 20, data bus DB and gate K to the device data bus DBD. The computer then increments the data address counter DAC for block B and decrements the word counter WC. The successive transfers of data words 2 through 5 of block B are accomplished by going through the flow chart path loop $\epsilon$–$\theta$–$\phi$ four additional times.

6*a*. Word Overflow

When this path is followed in transferring the last data word 5 of block B, the word counter WC for block B is decremented to zero and an overflow signal is applied over lines 10' and 10, to enable gate H, set flip-flop FF–III producing a "word overflow" signal W which resets flip-flop FF–II. This completes the transfer of the five data words in block B.

7. Use Wired Address for Data Block C

The transfer of the data words in block C is accomplished by following the "wired address" flow chart path $\epsilon$–$\beta$ which uses the incremented content of the list address counter LAC to get the address of the counters for block C from the list of addresses LA and transfer it back to the address register AR.

7*a*. Block Overflow

During this procedure, the block counter BC is decremented to zero because data block C is the last block to be transferred. A "block overflow" signal is generated and applied over line 10 and through gate J to set the block overflow flip-flop FF–IV.

8. Transfer Data Block C

The flow chart path $\epsilon$–$\theta$–$\phi$ is then followed to transfer data word 1 of block C over bus DB and DBD to the I/O device. The flow chart path $\epsilon$–$\theta$–$\phi$ is followed a second time to transfer the last data word 2 of block C.

8*a*. Word Overflow

The word counter WC for block C is decremented to zero and generates a "word overflow" signal. The flow chart path followed in the performance of this last data word transfer is slightly different because "block overflow" flip-flop FF–IV was set during traversal of the preceding "wired address" path. Therefore, the output of flow chart box 61 is a "yes" signal leading through box 67 to a termination 64 of the entire I/O process. In the equipment, the "word overflow" signal from the word counter WC for block C acts through gate H to set flip-flop FF–III.

9. Terminate

Since flip-flop FF–IV is already set and flip-flop FF–I has remained set during the entire procedure, the "and" gate T is enabled to pass a signal through the "or" gate X which is a terminate signal TERM applied over line 14 to the control unit CU, over line 15 to reset flip-flops FF–III and FF–IV, and over line 16 to the computer processor PROC.

An earlier termination of the entire I/O procedure can be made to occur when any data word in any of blocks A, B or C contains an "end of text" ETX control character. When such a control character is present on the controller data bus DB and is applied through gate L to the monitor M, an ETX signal is generated which is applied through "or" gate X as a terminate signal TERM. This is represented in the flow chart by the path 65 from box 56 through box 67 to the termination 64.

A transfer of fewer than the total number of data words within any one of blocks A, B or C may be accomplished by the presence of a program-inserted "unit separator" US control character in the last data word desired to be transferred from the given block. If the "unit separator" US character appears in any word in block A or block B, the flow chart path followed is from box 57 through path 66, box 59 and box 60 to decision box 61. In this case, flip-flop FF–IV is not set so that the path followed is to return through box 62 and point $\phi$ to point $\epsilon$ for transferring data words of the next following data block. However, if the "unit separator" US signal occurs in a data word in block C, the flip-flop FF–IV was previously set by the overflow signal from block counter BC so that the path from decision box 61 is through box 67 to the termination 64.

The foregoing describes the operation of the system in completing a transfer, with memory chaining, of data words in the "write" direction from blocks A, B and C in the computer to the I/O device. The entire procedure is accomplished with a minimum of involvement by the computer processor. That is, the complete transfer is made with only a single initialization involving steps 30, 31, 32, 33 and 34 in the flow chart. This is a much more economical and speedy process than is required according to the prior art when memory chaining is not provided.

OPERATION WITHOUT MEMORY CHAINING

The described system is also capable of "write" transfers in the conventional manner in response to a simple I/O transfer command (without memory chaining) which is decoded by the control unit CU. The control unit CU causes flip-flop FF–V to be reset, and causes flip-flop FF–I to be reset. The output of flip-flop FF–I causes flip-flop FF–II to also be reset. This initialization procedure is illustrated in the flow chart of FIG. 2*a* by the steps 30 through 34 and 70. FIG. 2*b* is a flow chart of the steps followed in response to a simple I/O transfer command. The procedure shown in FIG. 2*b* is capable of what is known as I/O chaining, but is not capable of the memory chaining illustrated in FIG. 2*a*. The procedure of FIG. 2*b* requires a complete initialization procedure to be accomplished between each different block of consecutive data words.

The flow chart of FIG. 2*b* includes the sequential steps, 36'-Send Data Channel Request to Processor, 37'-Request Granted, 39'-Gate Wired Address to Address Bus, 53'-Send Data Received on I/O Bus to I/O Device and to Monitor, 54'-Wait for I/O Data Bus Strobe, 55'-Send I/O Bus Strobe to I/O device, 56'-Recognize end of text ETX signal, 58'-Recognize Word Overflow, 62'-Recognize Acceptance of Data by I/O Device, and return path 72.

One traversal of the FIG. 2*b* flow chart loop accomplishes the transfer of a single data word. Successive traversals of the loop accomplish the transfer of additional successive data words. The transfers continue until a "word overflow" signal is recognized or an "end of text" control character is recognized. Thereafter, the procedure is terminated and the entire initialization procedure must be repeated before additional data words may be transferred.

Figure 2A:
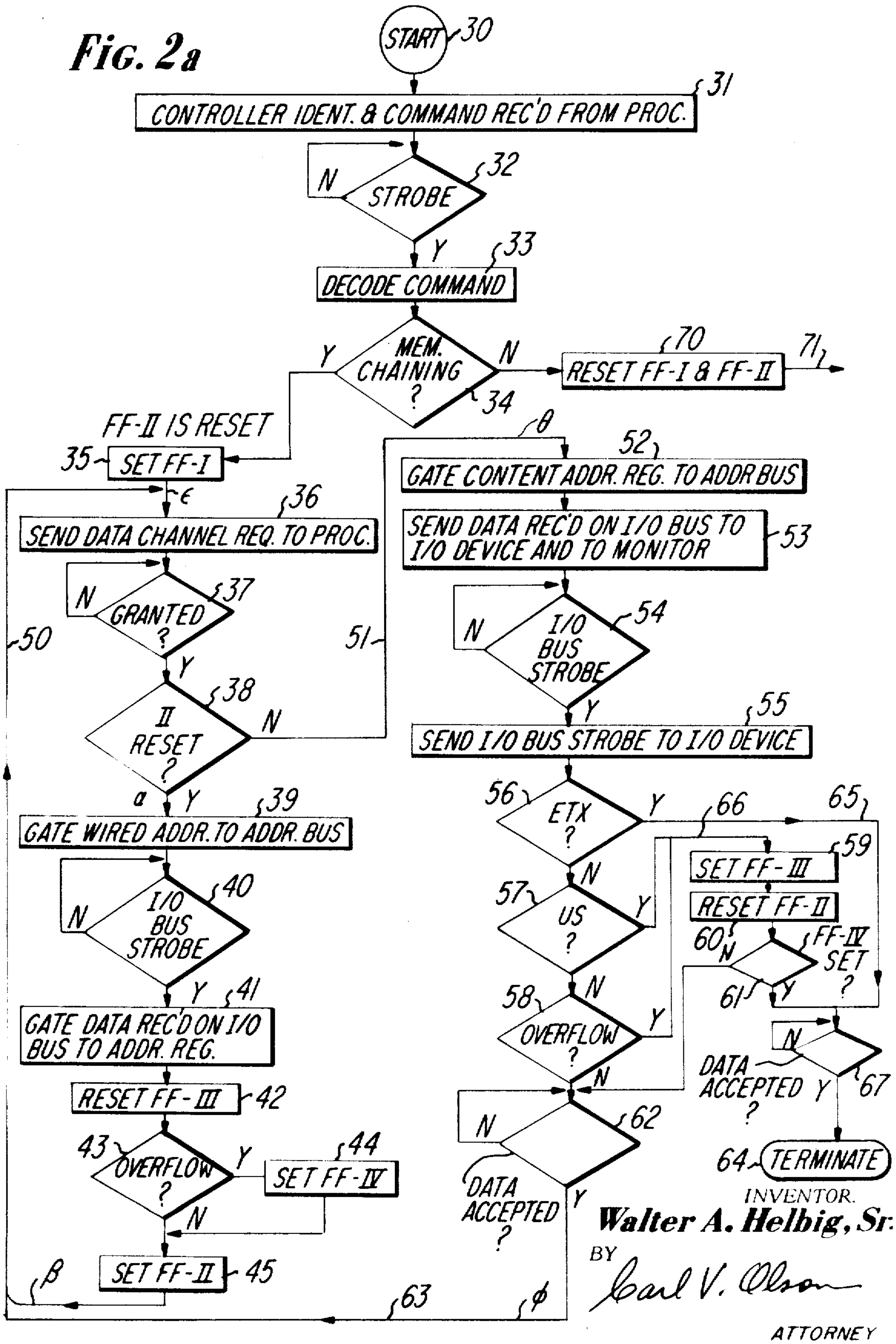
FIG. 2*a* is a flow chart which will be referred to in explaining the operation of the system of FIGS. 1*a* and 1*b* when operated to provide memory chaining transfers in the "write" direction from the computer to the I/O device.
Figure 2B:
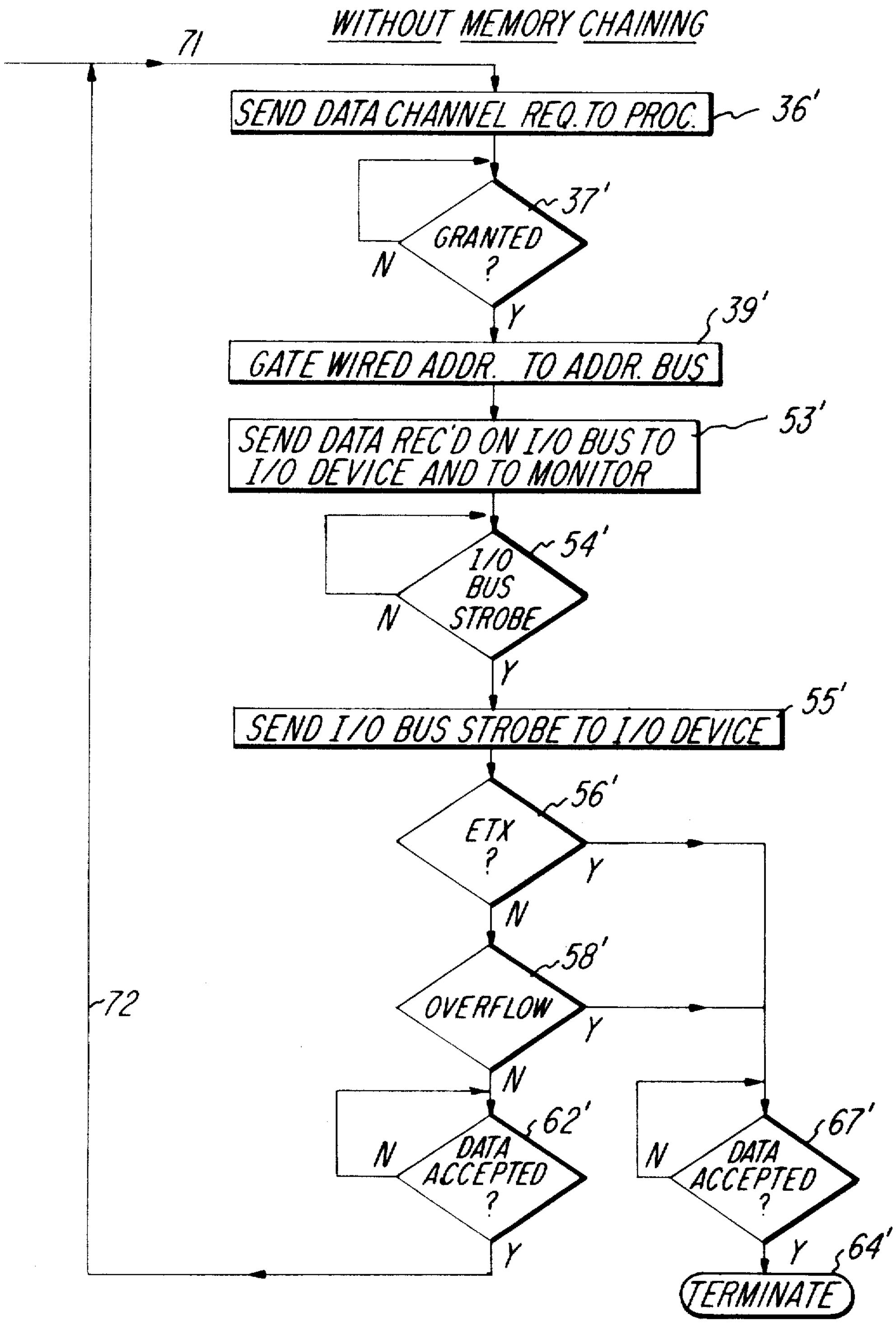
FIG. 2*b* is a flow chart which will be referred to in explaining the operation of the system of FIGS. 1*a* and 1*b* when operated for "write" transfers in a conventional mode not providing memory chaining.

The operation of the equipment is in accordance with the flow chart of FIG. 2*b* when flip-flop FF–I is placed in its reset state, and the operation is in accordance with the flow chart of FIG. 2*a* when flip-flop FF–I is placed in its set state. The equipment is therefore constructed to operate in either the conventional manner, or in the memory chaining manner.

DESCRIPTION OF FIG. 3

FIG. 3 illustrates a computer I/O system including a single computer, and a plurality of I/O controllers connected with the single computer. The drawing shows the computer memory as including blocks A, B, C and D of data words. The memory also includes dedicated counters DC–1, lists of addresses LA–1 and pairs of counters PC–1 for use by a first I/O controller 81, and dedicated counters DC–2, lists of addresses LA–2 and pairs of counters PC–2 for use by a second I/O controller 82. The program in the computer is assumed to have decided that the first controller 81 should receive data words in blocks A, B and D, in sequence, and that the second controller 82 should receive data words in blocks A, D and C, in sequence. (Any desired sequence may be employed.) The computer program is assumed to have established the contents of the memory locations shown in preparation for the use thereof in a manner described in connection with FIGS. 1*a*, 1*b*, 2*a* and 2*b*. Blocks A, B, C and D of data words are used by both controllers, and this economical use of memory space is possible because of the construction and organization of the I/O controllers. The two controllers operate independently of each other in sequentially transferring the data words in their respective combination of blocks of data words. Of course, a particular individual memory cycle can be used by only one controller, but the two controllers can utilize interleaved memory cycles.

The memory space required according to FIG. 3 is to be contrasted with the more extravagant space or computer program overhead requirements of prior art arrangements. Prior arrangements do not include memory space for lists of addresses LA–1 and LA–2, or pairs of counters PC–1 and PC–2. This is because prior arrangements employ dedicated counters such as DC–1 and DC–2 for directly accessing desired data words in a single block of sequential data word storage locations. The prior arrangements then require storage locations for all the data words of block A, for use by the first controller, and additional storage locations for the same block A of data words for use by the second controller. Since a block of data words normally may include a very large number of data words, the necessity for providing duplicate storage locations for the data words is undesirably expensive.

Duplicate storage locations for each block of data are required according to the prior art because pairs of counters PC–1 and PC–2 are not included for keeping account of the order in which blocks of data are to be transferred. All the data words intended for one controller must be arranged in a single block of sequential locations for sequential access by the dedicated counter, and all the data words intended for the other controller must be arranged in a different single block of sequential location for sequential access by the other dedicated counter. That is, the single block of data words for the first controller must include the words of blocks A, B and D in continuous sequential memory locations, and the data words for the second controller must include the words of blocks A, D and C in continuous sequential memory locations.

Alternatively, the prior art arrangement can employ the common storage of data blocks A, B, C and D shown in FIG. 3 and accomplish the transfers to a controller of the block A of data, followed by a termination and a going through of an entire initialization procedure before accomplishing a transfer of block B. This must be repeated for each additional block. The initialization procedure thus required prior to each data block transfer is expensive in terms of required computer program overhead. The computer I/O system according to the invention is thus seen to be relatively very economical in its requirements for main memory space, and/or relatively very economical in its requirements for computer program overhead.

DESCRIPTION OF DATA TRANSFERS IN THE "READ" DIRECTION

The invention has been described in terms of transfers of data words in the "write" direction from main memory locations to I/O devices. A description of analogous transfers of data words in the opposite or "read" direction from I/O devices to corresponding main memory locations will now be given. The I/O controller of FIG. 1*a* includes a read-write flip-flop FF–V which is set when data transfers are to be in the "read" direction. The absence of a reset (write) output *Wr* disables gate K, and the presence of a set (read) output *Re* enables a gate Y, so that data will flow from device data bus DBD to data bus DB. The outputs of flip-flop FF–V also disable gate L and enable a gate Z. Gate Z is provided to signal the processor over line 97 that data for it is on data bus DB.

Figure 4:
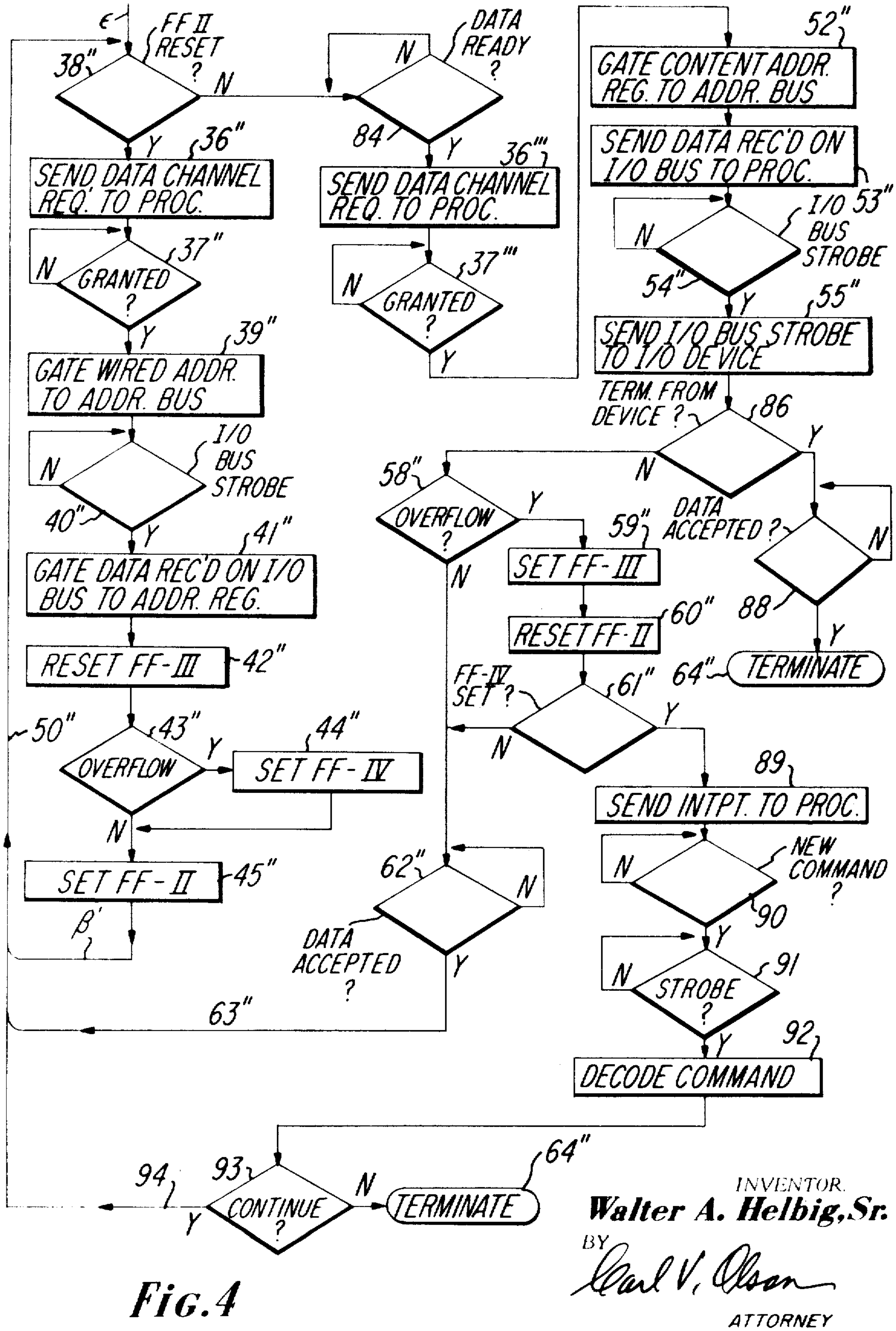
FIG. 4 is a flow chart describing the operation of the system to provide memory chaining in the "read" direction.

The flow chart of FIG. 4 describes memory chaining data transfers in the read direction starting from the point $\epsilon$, which is the point reached in the flow chart of FIG. 2A after the memory chaining command initiation procedures have been completed. These procedures following a "Read With Memory Chaining" command include the resetting of flip-flop FF–I and the setting of read-write flip-flop FF–V. The following flow chart steps from $\epsilon$ to $\beta'$ include steps shown in the "wired address" loop between $\epsilon$ and $\beta$ in FIG. 2*a*, and the steps are given the same reference numerals with double prime designations added.

The "read" flow chart of FIG. 4 differs from the "write" flow chart of FIG. 2A in including a "Data Ready?" decision box 84 for recognizing a "Data Ready" signal received by the controller command unit CU over line 85 from the I/O device. The flow chart then includes boxes 36''' and 37''' which are the same as boxes 36'' and 37'', respectively.

The flow chart then follows a path including boxes 52'' through 55'', which correspond with boxes 52 through 55, respectively in FIG. 2*a*. A decision box 86 is then entered which determines whether a termination signal has been received by the control unit CU over line 87 from the I/O device. When there is a "yes" output from box 86, the path followed is through 88-Data Accepted to 64''-I/O Termination. When there is a "no" output from box 86, the path followed includes boxes 58'' through 62'' and a return over 63'' to $\epsilon$, which path is the same as path 58 through 63 in FIG. 2*a*.

The "read" flow chart in FIG. 4 is different in having an "interruption" path from the "yes" output of box 61'' including 89-Send Interrupt to Processor, 90-Is New Controller Identifier and Command Received from Processor?, 91-Command Strobe Received, 92-Decode Command, and 93-Continue. The box 89 represents the sending of an interrupt signal from the control unit CU to the computer over line 16. The box 90 represents the waiting by the control unit CU for a new command from the computer. Box 92 represents the decoding of the new command to follow a path through the "yes" output of box 93 and path 94 back to $\epsilon$, or through the "no" output of box 93 to I/O termination 64''. This "interruption" path may be followed when the output over line 95 of block overflow flip-flop FF–IV is used to signal the completion of a quantity of data transfers which may exhaust the available space in the main memory and require transfers from the I/O device to be interrupted while the processor makes more main memory space available by transfers from the main memory to peripheral storage means. When the computer command in box 92 requests a continuation of data transfers from the I/O device, the path from box 93 back over line 94 is followed. If the computer command requests termination, the path to the Termination 64'' is followed and a terminate signal is sent over line 96 from the control unit CU to the I/O device.

What is claimed is:

1. In an I/O system including a computer having a main memory, the memory having a dedicated counter location dedicated to an I/O controller for addressing sequential memory locations each of which contains the address of a data address counter for sequentially addressing memory word locations containing a block of data words, an I/O controller comprising, an address register, means to supply the address of the dedicated counter location to the computer and to receive in said address register the address of a first data address counter, means to successively supply the content of said address register to the computer and to successively transfer the data words of a block, means operative in response to a first stimulus to again supply the address of the dedicated counter location to the computer and to receive in said address register the address of a next data address counter for use in transferring data words of a next block, and means operative in response to a second stimulus to subsequently terminate the I/O operation.

2. A controller as defined in claim 1 wherein said first stimulus is an overflow signal received from the computer during a data word transfer.

3. A controller as defined in claim 1 wherein said first stimulus is the presence of a first predetermined control character in a transferred data word.

4. A controller as defined in claim 1 wherein said second stimulus is an overflow signal received from the computer during use of the dedicated counter location.

5. A controller as defined in claim 1 wherein said second stimulus is the presence of a second predetermined control character in a transferred data word.

6. In an I/O system including a computer having a main memory, the memory having a dedicated counter location dedicated to an I/O controller for addressing sequential memory locations each of which contains the address of a data address counter for sequentially addressing memory word locations containing a block of data words, an I/O controller comprising, an address register, an address bus, and a data bus, means using said address bus to supply the address of the dedicated counter location to the computer, and using said data bus to receive in said address register the address of a first data address counter, means using said address bus to successively supply the content of said address register to the computer, and using said data bus to successively transfer data words of a block, means operative in response to an overflow signal received from the computer during a data word transfer to again supply the address of the dedicated counter location over said address bus to the computer, and to use said data bus to receive in said address register the address of a next data address counter for use in transferring data words of a next block, and means operative in response to an overflow signal received from the computer during use of said dedicated counter location to subsequently terminate the I/O operation.

7. In an I/O system including at least one I/O device and a computer having a main memory, the memory having a dedicated counter location dedicated to an I/O controller for addressing sequential memory locations each of which contains the address of a data address counter for sequentially addressing memory word locations containing a block of data words, an I/O controller, comprising a first flip-flop responsive to a decoded command from the computer to store a memory chaining status, a second flip-flop having an initial "wired address" state, an address register, an address bus, and a data bus, means conditioned by the "wired address" state of said second flip-flop to supply over said address bus the address of the dedicated counter location to the computer, and over said data bus to receive in said address register the address of a first data address counter, and to change said second flip-flop to an "address register" state, means conditioned by the "address register" state of said second flip-flop and using said address bus to successively supply the content of said address register to the computer and using said data bus to successively transfer data words of a block, a third flip-flop conditioned by the "address register" state of said second flip-flop and an overflow signal received from the computer to assume a "word overflow" state, means to change the second flip-flop to its "wired address" state for the supplying of the address of the dedicated counter location to the computer, and to return the second flip-flop to its "address register" state for the transferring of data words of a next block, a fourth flip-flop conditioned by a "wired address" state of said second flip-flop and an overflow signal received from the computer to assume a "block overflow" state, and means responsive to the "word overflow" and "block overflow" states of said third and fourth flip-flops to cause a termination of the I/O operation.

8. A data transfer system, comprising means for storing a plurality of blocks of data words, a plurality of data address counters each initially storing the address of the first data word of a corresponding block of data words, sequential storage locations storing a list of the addresses of said data address counters in the order in which said blocks of data words are to be transferred, a dedicated counter initially storing the address of the first location of said list of addresses, means using one data address counter at a time to sequentially transfer the data words of the associated block of data words, and means using the dedicated counter and the list of addresses to sequentially access said data address counters for the sequential transferring of said blocks of data words.

9. A computer input-output system, comprising memory locations for a plurality of blocks of data words, memory locations for a plurality of address counters each initially storing the address of the first data word of a corresponding block of data words, sequential memory locations for a list of the addresses of said data address counters in the order in which said blocks of data words are to be transferred, a memory location for a dedicated counter initially storing the address of the first location of said list of addresses, and computer means using one data address counter at a time to sequentially transfer the data words of the associated block of data words, and using the dedicated counter and the list of addresses to sequentially access said data address counters for the sequential transferring of said blocks of data words.

10. A computer input-output system as defined in claim 9 wherein said computer means includes a processor and an I/O controller connected by a data bus, said I/O controller having means responsive to a first stimulus to discontinue the transferring of data words of a block and transfer data words of a next block, and second means responsive to a second stimulus to terminate the transferring of data words.

11. A system as defined in claim 10 wherein at least one of said stimuli is an overflow signal received from said processor.

12. A system as defined in claim 10 wherein at least one of said stimuli is the presence of a predetermined control character on said data bus.

13. A computer input-output system, comprising an I/O controller, a computer processor, and a computer memory, said memory containing storage locations for:

a plurality of blocks of data words, a plurality of counter locations each containing a data address counter for a first data word address of a respective block of data, and a word counter for the number of the words in the block, a list of addresses of said counter locations in the order in which the respective blocks of data are to be transferred, and a dedicated counter location containing a list address counter for the address of the first one of the locations containing said list of addresses, and a block counter for the number of blocks to be transferred;

means responsive to a chaining command from said computer to follow an addressing path through the list address counter, the first location in the list of addresses, and a first data address counter to transfer a first data word in a first block of data, each address counter being incremented and each associated word and block counter being decremented after an access, means using the successively-incremented contents of the data address counter to successively transfer data words in the first data block until the successively-decremented word counter signals the end of the data block, means to follow addressing paths through the successively-incremented list address counter, the list of addresses, and data address counters to similarly transfer blocks of data words until the successively-decremented block counter signals the end of the transfer of all blocks of data.

14. A computer system, comprising a computer having a main memory, the memory having a dedicated counter location dedicated to an I/O controller for addressing sequential memory locations each of which contains the address of a data address counter for sequentially addressing memory word locations containing a block of data words, an I/O controller including a dedicated counter address source, an address register, a word overflow flip-flop and a block overflow flip-flop, control lines, an address bus, and a data bus connecting the computer and the controller, means in said controller including said dedicated counter address source to supply over said address bus to the computer the address of the dedicated counter location, and to receive in said address register over said data bus the address of a first data address counter, means in said controller including said address register to successively supply over said address bus the content of said address register to the computer, and to successively transfer over said data bus the data words of a block, means in said controller including said word overflow flip-flop operative in response to an overflow signal received from the computer during a data word transfer to again supply the address of the dedicated counter location over said address bus to the computer, and to use said data bus to receive in said address register the address of a next data address counter for use in transferring data words of a next block, and means in said controller including said block overflow flip-flop operative in response to an overflow signal received from the computer during use of said dedicated counter location to subsequently terminate the I/O operation.

15. A computer system as defined in claim 14 wherein said I/O controller also includes a control unit, a read-write flip-flop, and a memory-chaining flip-flop, and means in said controller including said control unit and said read-write and memory-chaining flip-flops to receive commands over said control lines from the computer and to condition the controller for read or write operation with or without memory chaining.

* * * * *